United States Patent [19]

Larigaldie et al.

[11] 4,228,479

[45] Oct. 14, 1980

[54] DEVICE FOR THE PRODUCTION OF A GASEOUS STREAM CARRYING ELECTRIC CHARGES

[75] Inventors: Serge Larigaldie, Chatenay-Malabry; Jean Cariou, Chatillon, both of France

[73] Assignee: Office National d'Etudes et de Recherches Aerospatiales (O.N.E.R.A.), Chatillon, France

[21] Appl. No.: 17,090

[22] Filed: Mar. 5, 1979

[30] Foreign Application Priority Data

Mar. 10, 1978 [FR] France ............................ 78 07067

[51] Int. Cl.$^{2}$ ............................ H01G 1/08; H05F 3/00

[52] U.S. Cl. ............................ 361/218; 361/230

[58] Field of Search ............... 361/213, 218, 222, 229, 361/230

[56] References Cited

U.S. PATENT DOCUMENTS

| | | | |
|---|---|---|---|
| 2,303,321 | 12/1942 | Bennett | 361/213 |
| 3,156,847 | 11/1964 | Schweriner | 361/230 |
| 3,317,790 | 5/1967 | Whitby | 361/230 |
| 3,396,308 | 8/1968 | Whitmore | 361/229 X |
| 3,611,030 | 10/1971 | Herbert, Jr. | 361/230 |
| 4,005,357 | 1/1977 | Parkinson | 361/218 X |
| 4,084,211 | 4/1978 | Okhotnikov et al. | 361/218 X |

FOREIGN PATENT DOCUMENTS

| | | | |
|---|---|---|---|
| 688433 | 3/1953 | United Kingdom | 361/222 |

*Primary Examiner*—J. D. Miller
*Assistant Examiner*—L. C. Schroeder
*Attorney, Agent, or Firm*—Stephen E. Feldman; Marvin Feldman

[57] ABSTRACT

A device for producing a gaseous stream carrying electric charges, particularly in view of influencing the electric voltage of a body, particularly of an airship such as a helicopter, comprising a metallic needle connected to a first pole of a high voltage electric source and having a point which is arranged in the neck of a metallic nozzle supplied with a source of compressed air to create a stream carrying the electric charges, the nozzle being arranged at one end of an electrically insulating hollow duct means for ejecting the stream towards the atmosphere, the ejection opening of the stream being surrounded by a massive hood made of an electrically insulating material.

12 Claims, 1 Drawing Figure

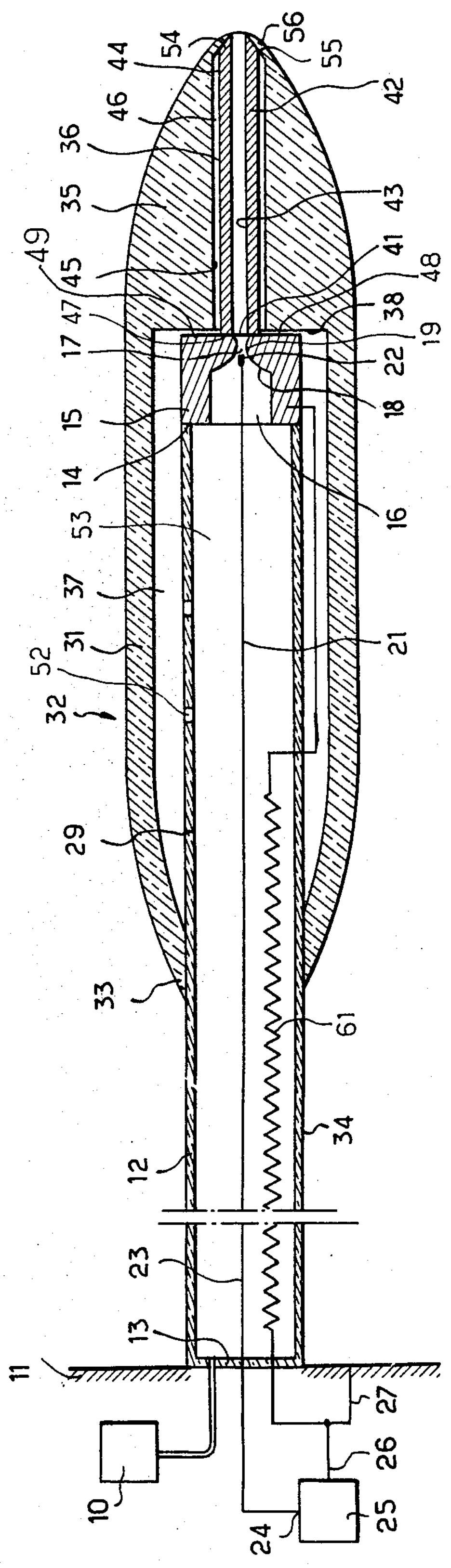
54
56
44
55
42
46
36
43
35
49
45
41
48
47
38
17
19
22
15
18
14
16
53
37
21
31
52
32
29
33
61
34
12
23
13
11
27
26
10
25
24

DEVICE FOR THE PRODUCTION OF A GASEOUS STREAM CARRYING ELECTRIC CHARGES

The invention relates to a device for producing a gaseous stream carrying electric charges.

Such a device allows modifying the electrostatic potential of a body relative to the environment medium, either to increase its value, to decrease it or to maintain it at a low value or even at a zero value.

In the aeronautics field for instance, the device according to the invention allows limiting the accumulation on a structure of electric charges appearing in flight, and this by providing their flow in the ambient atmosphere.

The electrostatic charge of a flying airship results substantially from a separation of electric charges when particles in suspension in the ambient air (rain drops, ice crystals, dusts, grains of sand, etc.) collide with its outer surfaces.

When the electrostatic potential of an airship reaches an excessive value, there appears spontaneously partial discharges, sometimes called Townsend or corona discharges and such discharges which exhibit a pulsed nature disturb the operation of the radio-communication and/or radio-navigation installations. In some cases, they make such installations inoperative.

The elimination of static electricity thus formed on airships poses a problem difficult to solve.

It has been proposed to provide fixed flying surface airships with bars made of a resistive material ending in one or several points or sharpened pins. The corona discharges which take place preferably at the extremities of said bars have a less disturbing effect than the discharges taking place in the tapered portions of the airship, and this due to the integration effect produced by the ohmic resistance of the bars. Such devices, or dischargers, avoid the advent of discharges at the points or ridges of the airship in the vicinity of the dischargers.

The operation of said dischargers is favoured by the relative displacement of the airship relative to the ambient air and they are particularly efficient on fast flying aircrafts. The same does not hold true when they are disposed on helicopters which fly at a relatively low speed and can even stay in a stationary flight.

Moreover, the configuration of a helicopter body makes difficult the positioning of such dischargers.

There has also been proposed for helicopters designed for the transportation of hung objects (crane-helicopters) or for assisting persons in danger, to establish during the manoeuvres an electrically conductive physical connection between the helicopter in a stationary flight and the underlying ground. If the helicopter is at a high value electric potential (which can reach a hundred or so of kV) accidents are to be feared for the people on the ground as well as regards a fire while transferring inflammable materials.

Earthing of helicopters via a conductive cable is therefore only a palliative and is not applicable in many cases.

In spite of researches which have been carried out in various directions, it has not been possible up to this day to provide helicopters or similar flying vehicles with efficient dischargers, except perhaps for particular configurations of helicopters (bi-rotors, rear engines). But, for such configurations, the points which have been placed in the fluxes of the rotors and/or the turbines of the aircraft have to be brought to a very high potential of the order of 200 kV, which represents often an inacceptable servitude from the point of view of security, mass and size.

Generating means for ions expelled at a high speed from a nozzle have not given the expected results, the rejection current of the electric charges being insufficient.

The exploitation of helicopters, in particular of "all-weather" helicopters, which have to go on blind flights, is therefore hampered by the accumulation of static electricity which disturbs the operation of the radio-navigation and the tele-communication instruments carried on board.

The invention fills up these gaps and palliates these difficulties.

Its object is a device acting on the electrostatic potential of a body by means of a stream of gaseous particles carrying electric charges.

This device comprises a metallic needle connected to a high voltage electric source, ejection means for ejecting towards the atmosphere a gaseous stream carrying electric charges through the agency of the needle, the ejection means being arranged at the end of a hollow insulating duct capped by an insulating cap.

The electric charges transported by the gaseous stream are supplied in a manner known per se by the point of the metallic needle to which is applied a high voltage and which is placed in the neck of an electricity conductive nozzle through which flows a compressed gas containing moisture traces.

According to a further characteristic of the invention, the nozzle is connected to the electric frame of the high voltage source through an electric connection comprising a high value decoupling resistance.

According also to a further characteristic of the invention, the ejection of the gaseous stream into the atmosphere is carried out through an electricity conductive tube but provided with a high ohmic resistance, in contact with the front face of the nozzle and closely surrounded by a head formed on the insulating cap. Thus, the electrically charged stream flows out at a distance from the nozzle.

In one of the uses of the invention, the hollow insulating duct is secured to a body the value of the electrostatic potential of which one wishes to limit, for instance the body of an airship, and the electric mass of the high voltage source is connected to the mechanical frame of the airship. The device is then suitable for discharging in the atmosphere electric charges accumulating during the flight on an airship structure.

According to another use, the device is applicable to the study of the effects produced on a body by the accumulation of electric charges which increase notably its electrostatic potential.

The body, for instance a helicopter standing on the ground, is subjected locally to the gaseous stream emitted by the device of the invention, so that it is possible to study the accumulation or the propagation of electric charges on the surface of a body and to determine the means to use for minimizing their influence.

The device according to the invention is then characterized in that the insulated hollow duct comprises means allowing directing the gaseous stream towards the surface the electrostatic potential of which it is desired to increase.

In the following description, reference is made to the accompanying drawing which shows schematically in axial cross-section an exemplary embodiment of the device according to the invention used as a discharger.

From body 11 of a helicopter or similar, the electric potential of which one desires to limit in order to maintain it at a substantially zero value, depends a hollow duct 12 made of an insulating material, the bottom 13 of which used for securing it to body 11 is used for the connection of the duct to a source 10 of compressed gas, such as air, containing traces of moisture. The duct 12, of circular cross-section, has a length of the order of 60 cm, this indication being of a non limitative character. At its end 14 opposed to bottom 13 is secured a metallic nozzle body 15 provided with a cylindrical pre-chamber 16 followed by the nozzle as such 17 the curved inner surface 18 of which provides the nozzle neck 19. At the center of the neck 19, along the axis of the nozzle is arranged the end 22 of a metallic needle 21 the other end 23 of which is connected to a pole 24 of a high voltage source 25 the other pole 26 of which is connected to the body 11 via a conductor 27.

The outer end portion 29 of the duct 12 and the nozzle body 15 are housed in the tubular body 31 of a cap 32 made of an insulating material such as "Plexiglas" or methyl methacrylate. The body 31 is cylindrical in shape and tapers towards its end turned towards the helicopter 11 so as to be jointed at its opening 32 with the outer cylindrical surface 34 of duct 12.

The body 31 of the cap 32 extends at the other end into a massive hood 35 of ogival shape, drilled to form an axial central channel 36 opening into the chamber 37 limited by body 31, the bottom of said chamber being formed with a shoulder portion 38. The diameter of the channel 36 is substantially superior to that of the outlet opening 41 of the nozzle, so that in the channel 36 may be housed a tube 42 the diameter of the inner surface 43 of which being precisely equal to the diameter of the outlet opening 41 of the nozzle and the thickness of which is such that the outer cylindrical surface 44 of said tube forms with the inner cylindrical surface 45 of channel 36 an annular gap 46. The inner front face 47 of tube 42 is in contact with the frontal face 48 of the nozzle body 15. The tube 42 is made of a non insulating material but of a high ohmic resistance which is of the order of $10^{10}\ \Omega$ and which can be considered therefore in this application as a "semiconductor".

In an embodiment which has given good results, the inner diameter of tube 42 was of the order of 3 mm and its length of 50 mm.

The annular gap 46 is in communication with the chamber 37 through a clearance 49 provided between the foreward frontal face 48 of the nozzle device and shoulder 38.

Openings 52 are provided in the wall forming the duct 12 and set the inner chamber 53 of said duct in communication with chamber 37.

The foreward end of tube 42 has a bevelled face 54 adapted to the inner surface 55 of the tapered summit portion 56 of cap 35.

A resistance 61 is interposed between the nozzle body 15 and the body 11 acting as the earth and is, in totality or in part, housed inside the hollow duct 12.

At the level of the supersonic nozzle neck, in the center of which is arranged the end 22 of the needle 21 to which a high voltage is applied, positive or negative according to the sigh of the charges to be ejected, are created low mobility charged particles resulting from the condensation of natural moisture contained in the air on the unipolar gaseous ions emitted by the corona discharge which takes place at the end 22 of the needle.

It has been established that by supplying the nozzle 17 with compressed air so as to obtain a supersonic flow in the neck 19 of the nozzle and in the channel 36, and with a high voltage source of the order of 10 kilovolts, the discharge current may reach a value of 60—70 $\mu$A for a pressure of 5 bar in chamber 53, result which was not possible to obtain so far with a discharger of this type.

It should be considered that this result is due not only to the fact that the stream is discharged into the atmosphere at a large distance from the body to be protected, but also and above all to the fact that the end of the insulating duct is provided with an insulating cap.

The presence of the insulating hollowed duct 17 eliminates practically the recirculation of the charges in the conductive structure of the airship.

The insulating cap 32 prevents any circulation of the current between the metallic parts of the discharger and the outside.

It inhibits also the corona discharges on the outer wall of the nozzle.

The electric connection between tube 42 and the nozzle body 15 prevents that the accumulation of charges on the inner wall of the tube gives rise to creeping discharges inside said tube.

On the other hand, the existence of a high pressure in the annular gap 46 inhibits discharges in said gap.

The presence of the decoupling resistance 61, the ohmic resistance of which, of the order of $5.10^8$ ohms, is distributed over its length, gives the possibility of obtaining a characteristic curve of the ejected current as a function of the voltage of the source which is little abrupt and therefore favourable to the stability of the operation.

Said resistance provides moreover an efficient protection as regards the high voltage generator.

It has been possible to push up the high voltage 24 up to a value of 30 kV.

In one embodiment, the device is adapted to the projection of electric charges. It is then portable. The needle 21 is connected to a pole of the high voltage source and the decoupling resistance 61 to the other pole.

The projection of the gaseous stream emerging from tube 42 allows accumulating electric charges, for instance on the body of a helicopter standing on the ground, to study said accumulation and/or the propagation of said charges on the surface of said body with a view to finding out means for minimizing their influence.

We claim:

1. A device for producing a gaseous stream carrying electric charges, particularly in view of influencing the electric voltage of a body, particularly of an airship such as a helicopter, comprising a metallic needle connected to a first pole of a high voltage electric source and having a point which is arranged in the neck of a metallic nozzle supplied with a source of compressed air to create a stream carrying the electric charges, the nozzle being arranged at one end of an electrically insulating hollow duct means for ejecting the stream towards the atmosphere, the ejection opening of the stream being surrounded by a massive hood made of an electrically insulating material.

2. A device according to claim 1, wherein the hood is integral with a cap surrounding a portion of the insulating duct which is in the vicinity of the nozzle.

3. A device according to claim 2, wherein, downstream of the nozzle, is provided a tube in contact with the frontal face of the nozzle and made of a material which is non insulating but having a high ohmic resistance, said tube being housed into the hood so that the electrically charged stream flows therethrough in view of its ejection in the atmosphere.

4. A device according to claim 3, said tube being housed in a channel of said hood, wherein a narrow annular gap is present between said tube and the hood channel, said gap being placed under a high pressure.

5. A device according to claim 4, wherein said gap is in connection with the compressed air supply used for the formation of the stream.

6. A device according to claim 5, wherein said gap is in connection with a compartment of the hood which is in communication with the inside of the duct where the compressed air flows.

7. A device according to claim 6, wherein the duct is formed with at least one opening in its portion housed inside the gap, and wherein a gap is provided between the frontal face of the nozzle and the connecting shoulder between the hood duct and said compartment.

8. A device according to claim 1, wherein the nozzle body is connected to a decoupling resistance.

9. A device according to claim 8, wherein it comprises means for directing the stream emerging from the hood towards an airship body.

10. A device according to claim 9, wherein the decoupling resistance is connected with an other pole of the high voltage source.

11. A device according to claim 1, wherein another end of the insulating hollow duct is secured onto the body of an airship.

12. A device according to claim 11, wherein another pole of the high voltage source is connected to the airship body and to an end of a decoupling resistance having another end connected to the nozzle body.

* * * * *